(12) United States Patent
Fujimura et al.

(10) Patent No.: US 11,135,577 B2
(45) Date of Patent: Oct. 5, 2021

(54) EXHAUST-GAS-PURIFYING METAL SUBSTRATE AND EXHAUST GAS PURIFICATION DEVICE USING SAME

(71) Applicant: CATALER CORPORATION, Kakegawa (JP)

(72) Inventors: Yuki Fujimura, Kakegawa (JP); Akio Kubota, Kakegawa (JP); Naoki Yokoyama, Kakegawa (JP); Junichi Hori, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 80 days.

(21) Appl. No.: 16/633,522

(22) PCT Filed: Jun. 22, 2018

(86) PCT No.: PCT/JP2018/023890
§ 371 (c)(1),
(2) Date: Jan. 23, 2020

(87) PCT Pub. No.: WO2019/031080
PCT Pub. Date: Feb. 14, 2019

(65) Prior Publication Data
US 2020/0230586 A1 Jul. 23, 2020

(30) Foreign Application Priority Data
Aug. 8, 2017 (JP) .............................. JP2017-153273

(51) Int. Cl.
*B01J 35/04* (2006.01)
*F01N 3/28* (2006.01)
(Continued)

(52) U.S. Cl.
CPC .............. *B01J 35/04* (2013.01); *F01N 3/281* (2013.01); *B01D 53/945* (2013.01);
(Continued)

(58) Field of Classification Search
CPC ................................. B01J 35/04; F01N 3/281
See application file for complete search history.

(56) References Cited

U.S. PATENT DOCUMENTS

| 4,186,172 A * | 1/1980 | Scholz .................... F01N 3/281 29/890 |
| 4,318,888 A * | 3/1982 | Chapman ............... B01D 53/86 29/890 |

(Continued)

FOREIGN PATENT DOCUMENTS

| JP | 2009178647 A | 8/2009 |
| WO | 2004/022937 A1 | 3/2004 |

OTHER PUBLICATIONS

Aug. 7, 2018 Written Opinion of the International Searching Authority issued in International Patent Application No. PCT/JP2018/023890.

*Primary Examiner* — Cam N. Nguyen
(74) *Attorney, Agent, or Firm* — Oliff PLC

(57) ABSTRACT

The invention provides: an exhaust-gas-purifying metal substrate capable of achieving both low pressure loss and high purification performance; and an exhaust gas purification device using the metal substrate. The invention relates to an exhaust-gas-purifying perforated metal substrate in which a corrugated foil and a flat foil are layered and made into a cylindrical shape, wherein: the perforated metal substrate includes from $50/in^2$ to $800/in^2$ of cells; the corrugated foil includes a plurality of first holes having an area that is from 2.0 to 50 times the average opening area of the cells; the flat foil includes a plurality of second holes having an area that is from 3.0 to 100 times the average opening area of the cells; and the average value of the area of the first holes in the corrugated foil is smaller than the average value of the area of the second holes in the flat foil.

8 Claims, 4 Drawing Sheets

(51) Int. Cl.
*B01D 53/94* (2006.01)
*B01J 23/63* (2006.01)
*F01N 3/022* (2006.01)

(52) U.S. Cl.
CPC ............... *B01D 2255/1021* (2013.01); *B01D 2255/1025* (2013.01); *B01J 23/63* (2013.01); *F01N 3/0222* (2013.01); *F01N 2330/04* (2013.01)

(56) References Cited

U.S. PATENT DOCUMENTS

| | | | | |
|---|---|---|---|---|
| 4,382,323 A * | 5/1983 | Chapman | ............... | B01D 53/86 29/890 |
| 4,829,655 A * | 5/1989 | Cornelison | ............. | B01J 27/22 29/527.4 |
| 5,618,498 A * | 4/1997 | Konya | ................ | B23K 1/0014 422/174 |
| 5,665,669 A * | 9/1997 | Yamanaka | ............ | B01J 23/862 420/103 |
| 5,898,016 A * | 4/1999 | Takei | ...................... | F01N 3/281 502/439 |
| 6,267,932 B1 * | 7/2001 | Nilsson | .................. | F01N 3/281 422/177 |
| 6,524,563 B1 * | 2/2003 | Wire | ..................... | A61K 8/0241 424/401 |
| 9,028,625 B2 * | 5/2015 | Inaguma | ................. | C25D 5/50 148/531 |
| 9,616,411 B2 * | 4/2017 | Inaguma | .............. | B01D 53/885 |
| 9,938,146 B2 * | 4/2018 | Lin | ........................ | B01J 23/894 |
| 10,307,749 B2 * | 6/2019 | Fowler | ..................... | B01J 29/06 |
| 2005/0170957 A1 | 8/2005 | Maus et al. | | |
| 2007/0197382 A1 * | 8/2007 | West | ..................... | B01J 19/249 502/240 |
| 2009/0148357 A1 * | 6/2009 | Kaneeda | ................ | B01J 37/0225 422/180 |
| 2010/0203238 A1 * | 8/2010 | Magno | ................. | B01J 37/0225 427/156 |
| 2010/0298130 A1 | 11/2010 | Murawaki et al. | | |

* cited by examiner

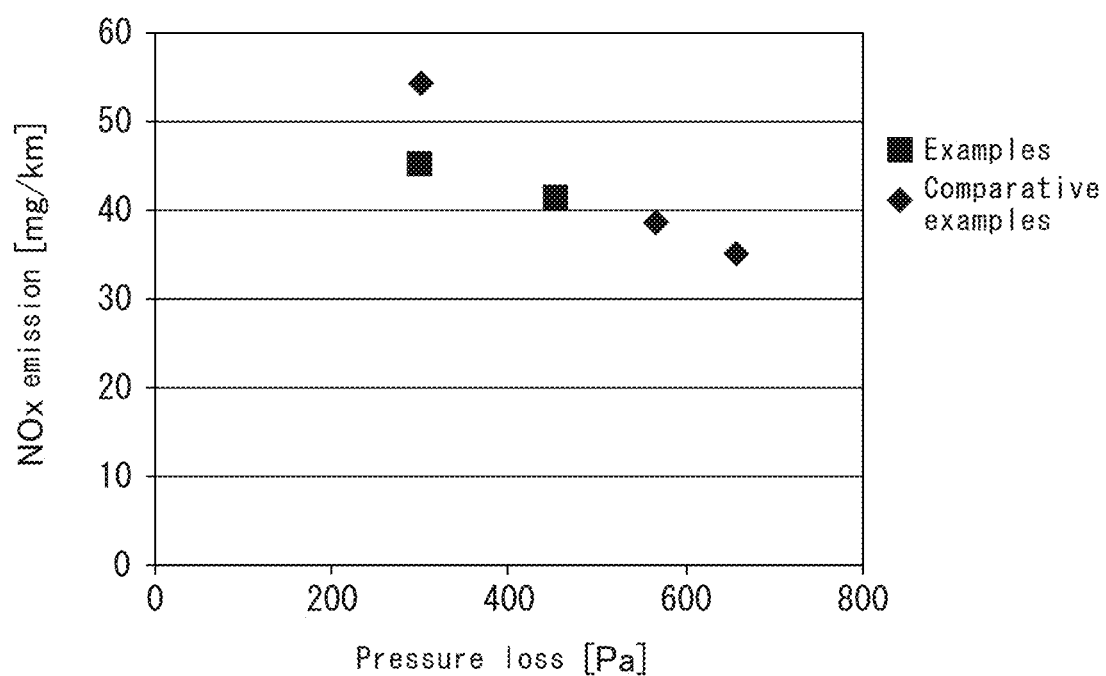

EXHAUST-GAS-PURIFYING METAL SUBSTRATE AND EXHAUST GAS PURIFICATION DEVICE USING SAME

FIELD

The present invention relates to an exhaust-gas-purifying metal substrate and an exhaust gas purification device using the same. In particular, the present invention relates to an exhaust-gas-purifying metal substrate capable of achieving both low pressure loss and high purification performance, and an exhaust gas purification device using the metal substrate.

BACKGROUND

Exhaust gas purification devices using substrates made of metal (metal substrates) are widely used as exhaust gas purification devices in internal combustion engines, such as in motor bikes, power generators, and agricultural machinery. Metal substrates are generally cylindrical laminated bodies of a corrugated metal foil and a flat metal foil. For example, as shown in FIG. 2, the metal foil is usually processed into a corrugated shape to obtain a corrugated foil (1), and the corrugated foil (1) is rolled together with a flat foil (2) which is a flat metal foil, to make the metal substrate (10) into a cylindrical shape. The cylindrical body thus obtained can be optionally inserted into an outer cylinder (4).

As shown in FIG. 3, when the metal substrate having the corrugated foil and the flat foil is viewed from the axial direction of the cylinder, the metal substrate has a number of cells. In an exhaust gas purification device in which a catalyst layer is formed on the metal substrate, exhaust gas passes through the cells and is purified by contacting the catalyst layer present on the wall surfaces of the cells.

PTL 1 and 2 disclose a perforated metal substrate having holes in the corrugated foil and flat foil as above, and an exhaust gas purification device using the same.

CITATION LIST

Patent Literature

[PTL 1] WO2004/022937
[PTL 2] Japanese Unexamined Patent Publication (Kokai) No. 2009-178647

SUMMARY

Technical Problem

Exhaust gas purification devices using such perforated metal substrates have good exhaust gas purification performance when the machine is warm, because the heat volume is smaller due to the presence of holes. Exhaust gas purification devices using perforated metal substrates exert an influence on the flow of gas due to the presence of holes, such that high purification performance can be imparted. However, concurrently, there is the problem that pressure loss is high. Exhaust gas purification devices with a large pressure loss negatively affect the fuel consumption of the internal combustion engine, and thus a lower pressure loss is preferable.

The object of the present invention is to provide a metal substrate for exhaust gas purification which can achieve both low pressure loss and high purification performance, and an exhaust gas purification device using the same.

Solution to Problem

The present inventors discovered that the above problem could be solved by the following means.

Aspect 1

A perforated metal substrate for purifying exhaust gas in which a corrugated foil and a flat foil are laminated and made into a cylindrical shape, wherein the perforated metal substrate has 50 cells/in$^2$ to 800 cells/in$^2$ of cells, the corrugated foil has a plurality of first holes having an area 2.0 times to 50 times the average opening area of the cells, the flat foil has a plurality of second holes having an area 3.0 times to 100 times the average opening area of the cells, and the average value of the area of the first holes of the corrugated foil is smaller than the average value of the area of the second holes of the flat foil.

Aspect 2

The perforated metal substrate according to Aspect 1, wherein the total area of the first holes of the corrugated foil is 60% or greater of the total area of all holes in the corrugated foil, and/or the total area of the second holes of the flat foil is 60% or greater of the total area of all holes in the flat foil.

Aspect 3

The perforated metal substrate according to Aspect 1 or 2, wherein the first holes of the corrugated foil have an area of 3.0 mm$^2$ to 100 mm$^2$, and the second holes of the flat foil have an area of 5.0 mm$^2$ to 200 mm$^2$.

Aspect 4

The perforated metal substrate according to any one of Aspects 1 to 3, wherein the ratio of the average value of the areas of the second holes of the flat foil to the average value of the areas of the first holes of the corrugated foil is in the range of 1.5 to 10.0.

Aspect 5

The perforated metal substrate according to any one of Aspects 1 to 4, wherein the flat foil and the corrugated foil each have an opening ratio in the range of 10% to 90%.

Aspect 6

The perforated metal substrate according to any one of Aspects 1 to 5, wherein the average opening area of the cells is 0.50 mm$^2$ to 7.0 mm$^2$.

Aspect 7

The perforated metal substrate according to any one of Aspects 1 to 6, wherein the corrugated foil and the flat foil each have a thickness in the range of 20 μm to 500 μm.

Aspect 8

An exhaust gas purification device having the perforated metal substrate according to any one of Aspects 1 to 7 and a catalyst layer formed on the perforated metal substrate.

BRIEF DESCRIPTION OF DRAWINGS

FIG. 5 represents pressure loss and purification performance of the Examples and Comparative Examples which used 100 cells/inch$^2$.

DESCRIPTION OF EMBODIMENTS

The perforated metal substrate for exhaust gas purification of the present invention has a corrugated foil and a flat foil laminated into a cylindrical shape, and has cells from 50 cells/inch$^2$ to 800 cells/inch$^2$. The corrugated foil has a plurality of first holes having an area of 2.0 times to 50 times the average opening area of the cells, and the flat foil has a plurality of second holes having an area of 3.0 times to 100 times the average opening area of the cells. The average value of the area of the first holes of the corrugated foil is smaller than the average value of the area of the second holes of the flat foil, such that the average value of a specific range area c is smaller than the average value of a specific range area s.

Figure 1:
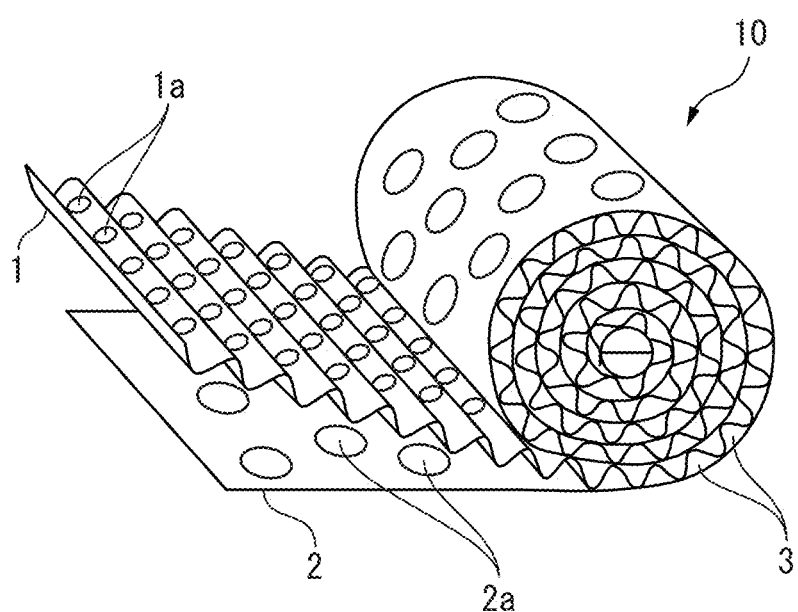
FIG. 1 schematically illustrates an aspect of the metal substrate of the present invention. The size, pitch, and number of the holes are not accurately represented.
Figure 2:
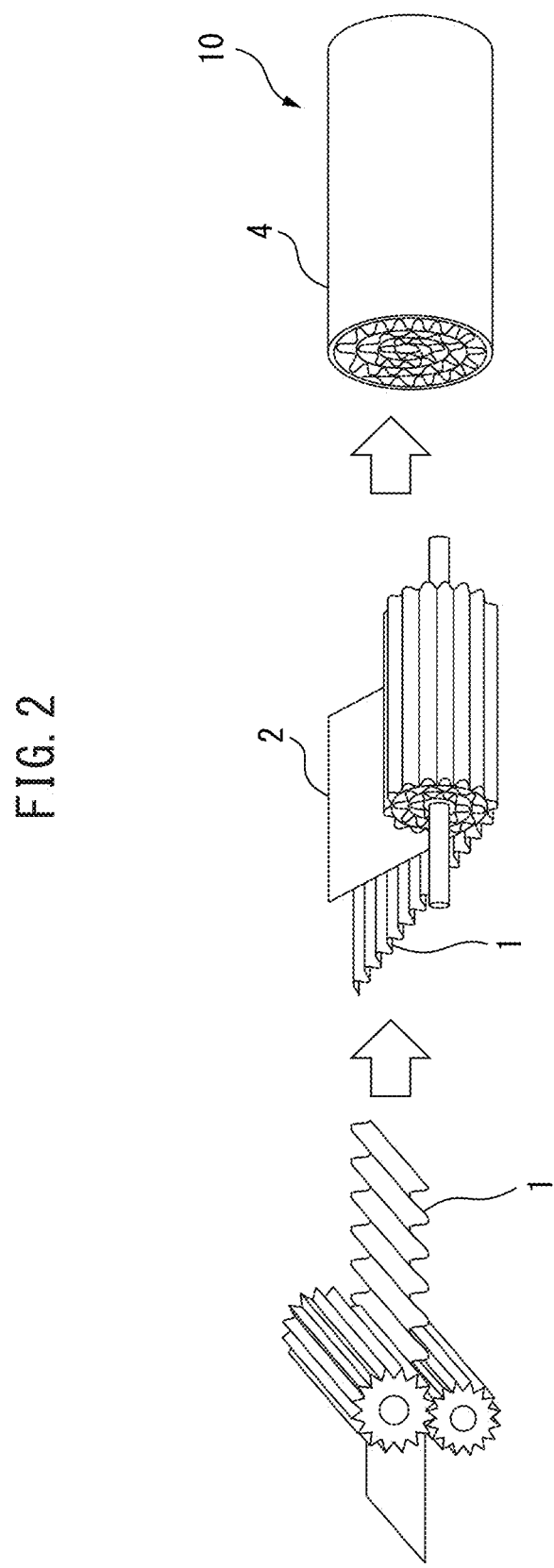
FIG. 2 is a schematic drawing showing the general manufacturing process for a metal substrate having a corrugated foil and a flat foil.

As shown in FIG. 1, the perforated metal substrate (10) for exhaust gas purification of the present invention has a corrugated foil (1) and a flat foil (2) laminated into a cylindrical shape, and has cells (3) formed by the corrugated foil (1) and the flat foil (2). The corrugated foil (1) has first holes (1a) and the flat foil has second holes (2a).

In conventional exhaust gas purification devices which used perforated metal substrates, the presence of holes improved the purification performance, but worsened pressure loss.

The following is considered to be the reason that the presence of holes improves purification performance. When holes are present, the geometric surface areas of the corrugated foil and the flat foil become smaller, and the contact area between the exhaust gas and the catalyst layer becomes smaller, but at the same time, expansion and contraction of the exhaust gas flow occurs, such that the flow is disorderly near the side walls. Thus, the boundary film at the layer interface between the exhaust gas and the catalyst layer is thin, and the substance transfer rate at that interface is improved. The improved substance transfer rate makes a stronger contribution than the decrease in contact area, such that the presence of holes improves purification performance. The presence of holes enables the diffusion of exhaust gas between neighboring cells. In an internal combustion engine, there is a bias in the flow of exhaust gas in the radial direction due to the fact that the flow rate distribution of the exhaust gas pipe cross-section is not uniform, and as a result, exhaust gas purification is not efficient, but due to the gas diffusion between neighboring cells, this bias in the flow of exhaust gas can be eliminated, such that exhaust gas purification performance improves.

The following is considered to be the reason that pressure loss becomes higher when holes are present. When holes are present, the geometric surface areas of the corrugated foil and the flat foil become smaller, and the contact area between the exhaust gas and the catalyst layer become smaller such that pressure loss is smaller, but the exhaust gas flow expands, contracts, diverges, and converges in the radial direction in the purification device such that each causes pressure loss. That contribution to pressure loss is greater, such that pressure loss becomes higher.

Thus, conventional exhaust gas purification devices which used a perforated metal substrate faced a trade-off between pressure loss and purification performance.

In contrast, the present inventors discovered unexpectedly that the above perforated metal substrate can provide an exhaust gas purification device which can achieve both low pressure loss and high purification performance. Without being bound to theory, this is considered to be due to the fact that the holes of the flat foil and the holes of the corrugated foil each have a different influence on pressure loss and purification performance. Essentially, it is considered that when the holes of the corrugated foil are large, pressure loss is improved (lowers) and purification performance worsens, whereas when the holes of the flat foil are large, pressure loss is improved (lowers) as the only result and purification performance worsening is not that significant. Thus, in the case when the holes in the corrugated foil are small and the holes in the flat foil are large in a certain range of area, it is possible to achieve both low pressure loss and high purification performance.

The holes present in the corrugated foil and in the flat foil may all be the same size, or may be different sizes within the range wherein the effect of the present invention is obtained. It is preferable that all the holes in the corrugated foil and in the flat foil be respectively the first holes and the second holes. However, within the range wherein the advantageous effect of the present invention is obtained, it is not necessary for all of the holes present in the corrugated foil and the flat foil to be the above first holes and second holes respectively. For example, the total area of the first holes of the corrugated foil can be 60% or greater, 70% or greater, 80% or greater, 90% or greater or 95% or greater of the total area of all holes in the corrugated foil, and/or the total area of the second holes in the flat foil can be 60% or greater, 70% or greater, 80% or greater, 90% or greater or 95% or greater of the total area of all holes in the flat foil.

The corrugated foil has a plurality of first holes having an area 2.0 times to 50 times the average opening area of the cells. For example, the area of the first holes can be 3.0 mm$^2$ or greater, 4.0 mm$^2$ or greater, 5.0 mm$^2$ or greater, 10 mm$^2$ or greater, 20 mm$^2$ or greater, or 50 mm$^2$ or greater, and can be 100 mm$^2$ or less, 80 mm$^2$ or less, 60 mm$^2$ or less, 40 mm$^2$ or less, or 20 mm$^2$ or less.

The holes of the corrugated foil, either all or a portion, can be a circle or an oval shape, or can be a non-circular shape, such as a polygonal shape. The equivalent diameter of the holes of the corrugated foil and/or the equivalent diameter of the first holes of the corrugated foil can be 2.0 mm or greater, 2.5 mm or greater, 3.0 mm or greater, 4.0 mm or greater, 5.0 mm or greater, or 7.0 mm or greater, and can be 20 mm or less, 15 mm or less, 10 mm or less, 7.0 mm or less, 5.0 mm or less, or 4.0 mm or less. Equivalent diameter refers to the diameter of a perfect circle having the circumference equal to the circumference of that surface.

The flat foil has a plurality of second holes having an area of 3.0 times to 100 times the average opening area of the cells. For example, the area of the second holes can be 3.0 mm$^2$ or greater, 4.0 mm$^2$ or greater, 5.0 mm$^2$ or greater, 10 mm$^2$ or greater, 20 mm$^2$ or greater, and 50 mm$^2$ or greater, or can be 100 mm$^2$ or less, 80 mm$^2$ or less, 60 mm$^2$ or less, 40 mm$^2$ or less, or 20 mm$^2$ or less.

The holes of the flat foil, either all or a portion thereof, can be a circle or an oval shape, or can be a non-circular shape, such as a polygonal shape. The equivalent diameter of the holes of the flat foil and/or the equivalent diameter of the second holes of the flat foil can be 3.0 mm or greater, 3.5 mm or greater, 5.0 mm or greater, 8.0 mm or greater, 10 mm or greater, or 12 mm or greater, and can be 25 mm or less, 20 mm or less, 15 mm or less, 10 mm or less, 7.0 mm or less, or 5.0 mm or less.

The ratio of the average value of the areas of the second holes of the flat foil to the average value of the areas of the first holes of the corrugated foil (average value of areas of first holes/average value of areas of second holes) is greater than 1.0, and can be, for example, 1.2 or greater, 1.5 or greater, 2.0 or greater, 3.0 or greater, or 5.0 or greater, or can be 15 or less, 10 or less, 8.0 or less, 6.0 or less, 4.0 or less, or 3.0 or less.

The pitch (distance between the centers of neighboring holes) of neighboring holes in the axial direction of the cylindrical metal substrate can be, for holes in each of the flat foil and the corrugated foil, 5.0 mm or greater, 6.0 mm or greater, 8.0 mm or greater, 10.0 mm or greater, 12 mm or greater, or 15 mm or greater, and can be 25 mm or less, 20 mm or less, 15 mm or less, 10 mm or less, 7.0 mm or less, or 5.0 mm or less. In this case, the pitch of the holes of the corrugated foil refers to the pitch if the corrugated foil were extended to be flat.

The pitch of neighboring holes in the circumferential direction of the cylindrical metal substrate can be, for each of the flat foil and the corrugated foil, 5.0 mm or greater, 6.0 mm or greater, 8.0 mm or greater, 10.0 mm or greater, 12 mm or greater, or 15 mm or greater, and 25 mm or less, 20 mm or less, 15 mm or less, 10 mm or less, 7.0 mm or less, or 5.0 mm or less. In this case, the pitch of the holes of the corrugated foil refers to the pitch if the corrugated foil were extended to be flat.

The opening ratio (percentage of volume decrease due to the presence of holes) of each of the flat foil and corrugated foil can be 10% or greater, 20% or greater, 30% or greater, 40% or greater, 50% or greater, or 60% or greater, and can be 80% or less, 70% or less, 60% or less, 50% or less, 40% or less, or 30% or less.

The holes of the flat foil and corrugated foil can be present uniformly across the entirety of the cylindrical metal substrate in the circumferential direction and in the axial direction, or can be concentrated in a portion thereof. For example, the holes of the flat foil and the corrugated foil do not need to be present at the ends. As described in PTL 2, the holes of the flat foil and the corrugated foil do not need to be present in the center portion in the axial direction.

The metal substrate of the present invention has 50 cells/inch$^2$ to 800 cells/inch$^2$ of cells. For example, there can be 80 cells/inch$^2$ or more, 100 cells/inch$^2$ or more, 150 cells/inch$^2$ or more, 200 cells/inch$^2$ or more, or 300 cells/inch$^2$ or more, and can be 600 cells/inch$^2$ or fewer, 400 cells/inch$^2$ or fewer, 300 cells/inch$^2$ or fewer, or 200 cells/inch$^2$ or fewer.

The average opening area of the cells can be calculated by the above number of cells, and can be 0.50 mm$^2$ or greater, 0.80 mm$^2$ or greater, 1.0 mm$^2$ or greater, 1.5 mm$^2$ or greater, 2.0 mm$^2$ or greater, 3.0 mm$^2$ or greater, or 5.0 mm$^2$ or greater, and can be 13 mm$^2$ or less, 10 mm$^2$ or less, 7.0 mm$^2$ or less, 5.0 mm$^2$ or less, 3.5 mm$^2$ or less, or 2.0 mm$^2$ or less.

The metal substrate of the present invention is a cylinder in which corrugated foil and flat foil are laminated. The metal substrate of the present invention can be a cylinder body formed by simply rolling one laminate body of a corrugated foil and a flat foil or a plurality of laminate bodies, or can be, as described in PTL 1, a cylinder body formed by rolling a plurality of laminate bodies in an S-shape.

Figure 3:
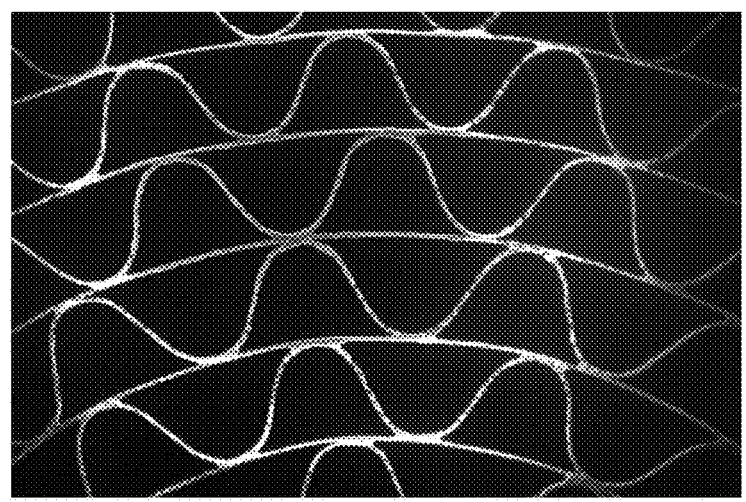
FIG. 3 is a photograph as an example of the metal substrate having a corrugated foil and a flat foil as viewed from the axial direction.

The corrugated shape of the corrugated foil used in the metal substrate of the present invention is not limited to the wave-shape as illustrated in FIG. 3, but can be formed with omega-curve shapes or zig-zag shapes.

The thickness of each of the corrugated foil and the flat foil are not particularly limited, but can be 20 µm or greater, 40 µm or greater, 80 µm or greater, or 100 µm or greater, and can be 500 µm or less, 300 µm or less, 200 µm or less, 100 µm or less, or 80 µm or less.

The punching holes can be made by punching the entirety of the metal foil using a punching machine such that the desired opening ratio is achieved. The shape of the holes is not limited.

The metal substrate of the present invention can have an optional outer cylinder. The cylindrical corrugated foil and flat foil can be placed in the interior of the outer cylinder, and can be joined thereto by means such as brazing.

The manufacturing method for the metal substrate of the present invention can include punching a metal foil using a punching machine to obtain the flat foil above; processing a flat foil to have a wave-like shape to obtain the corrugated foil above; and laminating the flat foil and corrugated foil and forming a cylinder therefrom. This method can include inserting the corrugated foil and flat foil as a cylinder into an outer cylinder and securing thereto.

The exhaust gas purification device of the present invention includes the above perforated metal substrate and a catalyst layer formed on the above perforated metal substrate. The catalyst layer can have a configuration known in the field as a catalyst layer having exhaust-gas-purifying performance. For example, the catalyst layer can have a metal oxide support provided on the surface of a metal substrate and a noble metal supported on the support.

The metal oxide support can be, for example, ceria, zirconia, alumina, a rare earth metal oxide, or a composite oxide consisting of a plurality thereof.

The noble metal can be, for example, platinum, palladium, or rhodium. These noble metals can be supported on the metal oxide support as particles with a particle size of, for example, 1 nm to 100 nm.

The method for manufacturing the exhaust gas purification device of the prevent invention can include providing the above perforated metal substrate; forming a layer of a metal oxide support on the above perforated metal substrate; and supporting a noble metal on the metal oxide support.

The step of forming a layer of a metal oxide support on the perforated metal substrate can include, for example, preparing a solution or slurry containing at least one selected from a metal oxide and/or a precursor thereof, applying the solution or slurry on the perforated metal substrate, and optionally firing the perforated metal substrate.

The step of supporting a noble metal on a metal oxide support can include impregnating a layer of metal oxide support with a solution containing a noble metal precursor, and firing the metal oxide support. A noble metal can be supported in the metal oxide and/or a precursor thereof in the solution or slurry to be applied to the perforated metal substrate in advance.

The exhaust gas purification device of the present invention can be used as an exhaust gas purification device in an internal combustion engine of motor bikes, power generators, and agricultural machinery.

The present invention will be specifically described by way of the Examples. However, the present invention is not limited thereto.

EXAMPLES

Perforated metal substrates having 300 cells/in$^2$ (average opening area of the cells: about 2 mm$^2$) using the corrugated foil and flat foil having the holes indicated in Table 1 below were manufactured. Identical catalyst layers were formed on these perforated metal substrates to manufacture exhaust gas purification devices of Examples 1 to 3 and Comparative Examples 1 to 9. For Comparative Examples 1 to 5 (Group A), the holes of the corrugated foil and the holes of the flat foil were the same size. For Comparative Examples 6 and 7 (Group B), the holes of the corrugated foil were larger than the holes of the flat foil. For Comparative Examples 8 and 9 (Group C), the holes of the corrugated foil were smaller than the holes of the flat foil, but the holes of the corrugated foil were slightly larger than the cell opening size. The holes of the corrugated foil and the holes of the flat foil were round, and were the same size in each foil. The opening ratios of the corrugated foil and the flat foil were 50%.

Perforated metal substrates having 100 cells/in$^2$ (average opening area of the cells: about 6.5 mm$^2$) using the corrugated foil and flat foil having the holes indicated in Table 2 were manufactured. Identical catalyst layers were formed on these perforated metal substrates to manufacture exhaust gas purification devices of Examples 4 to 6 and Comparative Examples 10 to 12. The holes of the corrugated foil and the holes of the flat foil were round, and were the same size in each foil. The opening ratios of the corrugated foil and the flat foil were 50%.

These exhaust gas purification devices were loaded onto a 125 cc scooter, and were evaluated in terms of exhaust-gas-purification performance based on the amount of NOx exhaust in accordance with the "WMTC Stage 2 class 1" mode.

These exhaust gas purification devices were open to the atmosphere at one end, and depressurized by a negative pressure pump at the other end, and the pressure loss for the case of a flow of a stipulated air flow amount was measured at room temperature. The space velocity (SV) in this case was 450,000 [1/hour].

Figure 4:
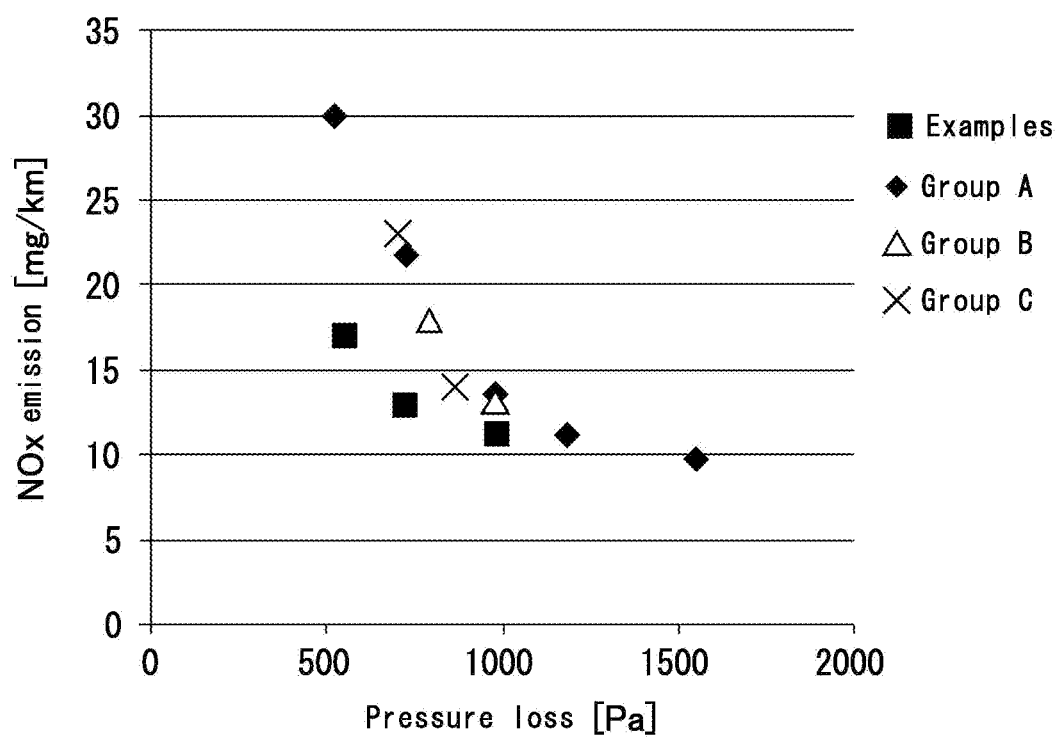
FIG. 4 represents pressure loss and purification performance of the Examples and Comparative Examples which used 300 cells/inch$^2$.

The results are shown in Table 1, Table 2, FIG. 4, and FIG. 5. With reference to FIG. 4 and FIG. 5, it is clear that the exhaust gas purification device of the present invention according to the Examples is able to achieve both low pressure loss and low NOx emission (high purification performance).

TABLE 1

Case with 300 cells/inch$^2$ (average opening area of the cells: about 2 mm$^2$)

| | | Corrugated foil | | Flat foil | | | Results | |
|---|---|---|---|---|---|---|---|---|
| | | Hole area [mm$^2$] | Hole area/ cell opening area | Hole area [mm$^2$] | Hole area/ cell opening area | Flat foil hole area/ corrugated foil hole area | Pressure loss [Pa] | NOx [mg/km] |
| | Example 1 | 4.5 | 2.3 | 10.2 | 5.1 | 2.3 | 987 | 11.2 |
| | Example 2 | 15.9 | 8.0 | 133 | 66.5 | 8.4 | 727 | 12.9 |
| | Example 3 | 50.3 | 25.2 | 154 | 77.0 | 3.1 | 554 | 17.0 |
| Group A | Comparative Example 1 | 0.8 | 0.4 | 0.8 | 0.4 | 1.0 | 1550 | 9.8 |
| | Comparative Example 2 | 4.5 | 2.3 | 4.5 | 2.3 | 1.0 | 1185 | 11.1 |
| | Comparative Example 3 | 15.9 | 8.0 | 15.9 | 8.0 | 1.0 | 976 | 13.5 |
| | Comparative Example 4 | 50.3 | 25.2 | 50.3 | 25.2 | 1.0 | 723 | 21.8 |
| | Comparative Example 5 | 133 | 66.5 | 133 | 66.5 | 1.0 | 521 | 30.0 |
| Group B | Comparative Example 6 | 10.2 | 5.1 | 4.5 | 2.3 | 0.4 | 981 | 13.1 |
| | Comparative Example 7 | 133 | 66.5 | 15.9 | 8.0 | 0.1 | 790 | 17.9 |
| Group C | Comparative Example 8 | 3.1 | 1.6 | 10.2 | 5.1 | 3.3 | 864 | 14.0 |
| | Comparative Example 9 | 3.1 | 1.6 | 133 | 66.5 | 42.9 | 698 | 23.1 |

TABLE 2

Case with 100 cells/inch$^2$ (average opening area of the cells: about 6.5 mm$^2$)

| | Corrugated foil | | Flat foil | | | Results | |
|---|---|---|---|---|---|---|---|
| | Hole area [mm$^2$] | Hole area/ cell opening area | Hole area [mm$^2$] | Hole area/ cell opening area | Flat foil hole area/ corrugated foil hole area | Pressure loss [Pa] | NOx [mg/km] |
| Example 4 | 15.9 | 2.4 | 133 | 20.5 | 8.4 | 453 | 41.5 |
| Example 5 | 50.3 | 7.7 | 154 | 23.7 | 3.1 | 301 | 45.3 |
| Comparative Example 10 | 4.5 | 0.7 | 10.2 | 1.6 | 2.3 | 659 | 35.2 |
| Comparative Example 11 | 15.9 | 2.4 | 15.9 | 2.4 | 1.0 | 566 | 38.6 |
| Comparative Example 12 | 133 | 20.5 | 133 | 20.5 | 1.0 | 302 | 54.3 |

REFERENCE SIGNS LIST

10 metal substrate
1 corrugated foil
1a first holes
2 flat foil
2a second holes
3 cells
4 outer cylinder

The invention claimed is:

1. A perforated metal substrate for purifying exhaust gas in which a corrugated foil and a flat foil are laminated and made into a cylindrical shape, wherein the perforated metal substrate has 50 cells/inch$^2$ to 800 cells/inch$^2$ of cells, the corrugated foil has a plurality of first holes having an area 2.0 times to 50 times the average opening area of the cells, the flat foil has a plurality of second holes having an area 3.0 times to 100 times the average opening area of the cells, and the average value of the area of the first holes of the corrugated foil is smaller than the average value of the area of the second holes of the flat foil.

2. The perforated metal substrate according to claim 1, wherein the total area of the first holes of the corrugated foil is 60% or greater of the total area of all holes in the corrugated foil, and/or the total area of the second holes of the flat foil is 60% or greater of the total area of all holes in the flat foil.

3. The perforated metal substrate according to claim 1, wherein the first holes of the corrugated foil have an area of 3.0 mm$^2$ to 100 mm$^2$, and the second holes of the flat foil have an area of 5.0 mm$^2$ to 200 mm$^2$.

4. The perforated metal substrate according to claim 1, wherein the ratio of the average value of the areas of the second holes of the flat foil to the average value of the areas of the first holes of the corrugated foil is in the range of 1.5 to 10.0.

5. The perforated metal substrate according to claim 1, wherein the flat foil and the corrugated foil each have an opening ratio in the range of 10% to 90%.

6. The perforated metal substrate according to claim 1, wherein the average opening area of the cells is 0.50 mm$^2$ to 7.0 mm$^2$.

7. The perforated metal substrate according to claim 1, wherein the corrugated foil and the flat foil each have a thickness in the range of 20 μm to 500 μm.

8. An exhaust gas purification device having the perforated metal substrate according to claim 1 and a catalyst layer formed on the perforated metal substrate.

* * * * *